United States Patent
Geuens et al.

(10) Patent No.: US 12,055,165 B2
(45) Date of Patent: Aug. 6, 2024

(54) METHOD FOR DETECTING OBSTRUCTIONS IN A GAS NETWORK UNDER PRESSURE OR UNDER VACUUM AND GAS NETWORK

(71) Applicant: ATLAS COPCO AIRPOWER, NAAMLOZE VENNOOTSCHAP, Wilrijk (BE)

(72) Inventors: Philippe Geuens, Wilrijk (BE); Ebrahim Louarroudi, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 535 days.

(21) Appl. No.: 17/418,146

(22) PCT Filed: Nov. 28, 2019

(86) PCT No.: PCT/IB2019/060292
§ 371 (c)(1),
(2) Date: Jun. 24, 2021

(87) PCT Pub. No.: WO2020/136477
PCT Pub. Date: Jul. 2, 2020

(65) Prior Publication Data
US 2022/0056933 A1  Feb. 24, 2022

Related U.S. Application Data

(60) Provisional application No. 62/785,253, filed on Dec. 27, 2018.

(30) Foreign Application Priority Data

Nov. 26, 2019  (BE) .................................. 2019/5839

(51) Int. Cl.
F15B 19/00  (2006.01)
F15B 21/048  (2019.01)
(Continued)

(52) U.S. Cl.
CPC .......... *F15B 19/005* (2013.01); *F15B 19/002* (2013.01); *F15B 21/048* (2013.01);
(Continued)

(58) Field of Classification Search
CPC .... F15B 19/005; F15B 19/002; F15B 21/048; F15B 2211/6309; F15B 2211/857;
(Continued)

(56) References Cited

U.S. PATENT DOCUMENTS 4,902,903 A * 2/1990 Segerson ................. G01D 5/34
 250/559.29
5,272,646 A * 12/1993 Farmer ............... G01M 3/2807
 73/40.5 R
(Continued)

FOREIGN PATENT DOCUMENTS

CN  108361560 A  8/2018
CN  112947328 A * 6/2021 ....... G05B 19/41875
(Continued)

OTHER PUBLICATIONS

Mohammad Burhan Abdulla et al., "Pipeline Leak Detection Using Artificial Neural Network", pp. 328-332 (Year: 2013).*
(Continued)

*Primary Examiner* — Michael J Dalbo
*Assistant Examiner* — Kaleria Knox
(74) *Attorney, Agent, or Firm* — Workman Nydegger

(57) ABSTRACT

A method is provided for detecting and quantifying obstructions in a gas network under pressure or vacuum. The gas network may be provided with a sensor(s) capable of recording the status of a source(s), consumers, or consumer
(Continued)

areas. The method includes: a possible start-up phase; a baseline or zero phase; and an operational phase. The operational phase includes: reading out the first group and second group of sensors; re-estimating, determining or calculating the physical model or mathematical relationship on the basis of the read measurements from the sensors; determining or calculating of the existence of an obstruction in the system based on the difference and/or its derivatives between the parameters of the physical model or mathematical relationship as determined during the baseline or zero phase and the operational phase; generating an alarm and/or generating a degree of obstruction and/or generating the corresponding obstruction if an obstruction is detected.

11 Claims, 2 Drawing Sheets

(51) Int. Cl.
  *F17D 1/04* (2006.01)
  *F17D 5/02* (2006.01)
  *G01M 3/28* (2006.01)
(52) U.S. Cl.
  CPC .............. *F17D 1/04* (2013.01); *F17D 5/02* (2013.01); *G01M 3/2815* (2013.01); *F15B 2211/20576* (2013.01); *F15B 2211/6309* (2013.01); *F15B 2211/6313* (2013.01); *F15B 2211/6323* (2013.01); *F15B 2211/6326* (2013.01); *F15B 2211/857* (2013.01); *F15B 2211/8855* (2013.01)
(58) Field of Classification Search
  CPC ...... F15B 2211/6323; F15B 2211/6313; F15B 2211/8855; F17D 1/04; F17D 5/02; G01M 3/2815; E15B 19/005; E15B 19/002
  See application file for complete search history.

(56) References Cited

U.S. PATENT DOCUMENTS

| | | | |
|---|---|---|---|
| 6,711,507 B2 | 3/2004 | Koshinaka et al. | |
| 6,973,375 B2 | 12/2005 | Brodeur et al. | |
| 7,049,975 B2 * | 5/2006 | Vanderah | G01D 9/005 340/870.03 |
| 2002/0157448 A1 * | 10/2002 | Hirai | G01F 25/13 73/1.16 |
| 2003/0187595 A1 | 10/2003 | Koshinaka et al. | |
| 2005/0182524 A1 | 8/2005 | Brodeur et al. | |
| 2014/0236390 A1 * | 8/2014 | Mohamadi | B64C 39/024 701/16 |
| 2016/0356665 A1 * | 12/2016 | Felemban | G01M 3/2807 |
| 2018/0196399 A1 | 7/2018 | Rasekh et al. | |
| 2018/0356046 A1 | 12/2018 | Gong et al. | |
| 2018/0356151 A1 | 12/2018 | Suraganda Narayana et al. | |

FOREIGN PATENT DOCUMENTS

| | | | | |
|---|---|---|---|---|
| CN | 116951999 A | * | 10/2023 | |
| DE | 202008013127 U1 | | 11/2009 | |
| DE | 202010015450 U1 | | 2/2011 | |
| EP | 2715314 B1 | * | 8/2016 | ............. F01N 11/00 |
| EP | 3409953 A1 | | 12/2018 | |
| JP | S61223400 A | | 10/1986 | |
| JP | 2003294503 A | | 10/2003 | |
| JP | 2007522587 A | | 8/2007 | |
| WO | WO-2007095699 A2 | * | 8/2007 | ............... F17D 5/02 |
| WO | WO-2017061994 A1 | * | 4/2017 | ............... F17D 1/04 |
| WO | WO-2017074426 A1 | * | 5/2017 | ........... E21B 43/122 |
| WO | 2020040800 A1 | | 2/2020 | |

OTHER PUBLICATIONS

Khazaali Mohanad Abdulzahra Ani "Optimization Procedure to Identify Blockages in Pipeline Networks via non-invasive Technique based on Genetic Algorithms", A thesis presented to the Fraduate and Research Committe of Lhigh University in Candidacy for the Degree of Master of Science; pp. 1-162 (Year: 2017).*
Office Action from Corresponding Japanese Patent Application No. JP2021-531371, Oct. 16, 2023.
International Search Report and Written Opinion from PCT Application No. PCT/IB2019/060292, Apr. 3, 2020.
International Preliminary Report on Patentability from PCT Application No. PCT/IB2019/060292, Dec. 22, 2020.
Search Report and Written Opinion from corresponding BE Application No. BE 201905839, Mar. 20, 2020.

* cited by examiner

METHOD FOR DETECTING OBSTRUCTIONS IN A GAS NETWORK UNDER PRESSURE OR UNDER VACUUM AND GAS NETWORK

BACKGROUND

The current invention relates to a method for detecting obstructions in a gas network under pressure or under vacuum.

More specifically, the invention is intended to be able to quantify obstructions that occur in a gas network.

"Gas" herein means for example air, but not necessarily. But also nitrogen or natural gas are possible.

"Obstruction" herein means a partial or total blockage in the gas network or an increase in the resistance of a pipeline.

Methods for monitoring or controlling a gas network under pressure are already known, whereby these methods are set up for long and straight pipelines, where the incoming flow is not necessarily equal to the outgoing flow due to the compressibility of the gas in question.

This method is based on a number of assumptions such as very long pipelines, straight pipelines, which are not suitable for complex gas networks under pressure where one or more compressor plants supply gas under pressure to a complex network of consumers. A final consumer may be an individual final consumer or include a so-called consumer area or a group of individual final consumers.

However, the above method only relates to detection of leaks in the gas network.

The disadvantage of such well-known methods is that they do not allow the detection of obstructions in the network of pipelines between the source and the consumers. Moreover, the gas network itself is a source of obstructions that should not be underestimated.

SUMMARY

The aim of the current invention is to provide a solution to this problem.

The current invention provides a method for detecting and quantifying obstructions in a gas network under pressure or vacuum; the gas network comprising:
 one or more sources of compressed gas or vacuum;
 one or more consumers, consumer areas of compressed gas or vacuum applications;
 pipelines or a network of pipelines to transport the compressed gas or vacuum from the sources to the consumers, consumer areas or applications;
 a plurality of sensors which determine one or a plurality of physical parameters of the gas at different times and locations in the gas network;
characterized by the fact that the gas network may further be provided with additional sensors indicating the state or status (e.g. on/off) of the sources, consumers and/or consumer areas and that the method comprises the following phases:
 a possible start-up phase during which the aforementioned sensors are to be used;
 a baseline or zero phase determining an initial physical model or mathematical relationship between measurements from a first set of sensors and a second set of sensors based on physical laws using estimation algorithms;
 an operational phase in which the physical model or mathematical relationship between the measurements of the first set of sensors and the second set of sensors is re-established at regular time intervals by means of estimation algorithms to predict gas network obstructions;
wherein the operational phase comprises the following steps:
 reading out the first group and second group of sensors;
 re-estimating, determining or calculating the physical model or mathematical relationship on the basis of the read measurements from the sensors;
 determining or calculating the existence of an obstruction in the system based on the difference, and/or its derivatives, between the parameters of the physical model or mathematical relationship as determined during the baseline or zero phase and the operational phase;
 generating an alarm and/or generating a degree of obstruction and/or generating the corresponding obstruction cost if an obstruction is detected.

The 'derivatives' of the difference means any mathematical quantity that can be extracted from the difference, for example a sum, cumulative sum, (weighted) mean, smallest squares sum, . . .

By 'at regular time intervals' is also meant continuous or almost continuous, i.e. the regular time intervals follow one another quickly.

An advantage is that such a method will make it possible to learn, detect and quantify obstructions in the gas network itself.

In other words, the obstructions detected by means of the method are not limited to obstructions in the sources or consumers of compressed gas, i.e. in the compressor units and pneumatic tools, but may also be obstructions in the pipelines of the gas network itself.

During both the baseline and the operational phases, a mathematical relationship is established between these sensors on the basis of known physical laws and using the measurements of the various sensors.

Hereby, an estimation algorithm is used.

This is based on the assumption that there are initially no significant obstructions in the gas network in the baseline or zero phase; in other words, it is based on a normal situation of the gas network or a so-called 'baseline' or zero. The mathematical model is also based on the assumption that there are no leaks in the gas network and that the topology of the gas network does not change.

In this way, a physical model, or mathematical model, can be created that represents the relationship between the different parameters measured by the sensors.

This model can then be used to immediately detect irregularities in future measurements of the sensors by comparing the baseline parameters and the parameters of the newly determined or calculated physical or mathematical model.

In this way, obstructions will be detected very quickly and, in case of detection of an obstruction, immediate action can be taken and the obstruction can be repaired.

Preferably, the above physical model or mathematical relationship shall take the form of a matrix of parameters or constants, wherein the modifications of these parameters or constants being followed up during the operational phase.

This matrix will be a measure of the 'resistance', or its inverse 'conductivity', of the network, or rather a measure of the 'resistance' or 'conductivity' that the gas experiences in the gas network.

Changes in the matrix indicate a change in resistance. By following up the changes in the matrix by recalculating the parameters of the matrix based on new sensor data, changes in resistance can be detected and obstructions can be detected.

Preferably, at certain moments, the operational phase is temporarily interrupted or stopped, after which the baseline or zero phase is resumed in order to redefine the physical model or mathematical relationship between the measurements of different sensors, before the operational phase is restarted.

Hereby, it should be noted that the process, i.e. the gas network with sources, pipelines, consumers and/or consumer areas, is not shut down, but only the method. In other words, if the operational phase is temporarily interrupted or stopped, the sources will still supply gas or vacuum to the consumers or consumer areas.

Interrupting the operational phase and resuming the baseline phase has the advantage that the physical model or the mathematical relation is updated.

This will make it possible to take into account the time-varying behavior of the gas network or system, so that changes, obstruction repairs or additions to the gas network can be taken into account.

The invention also concerns a gas network under pressure or under vacuum; the gas network is at least provided with:
one or more sources of compressed gas or vacuum;
one or more consumers, consumer areas of compressed gas or vacuum applications;
pipelines or a network of pipelines to transport the gas or vacuum from the sources to the consumers, consumer areas or applications;
a plurality of sensors which determine one or a plurality of physical parameters of the gas at different times and locations in the gas network;
with the characteristic that the gas network is further provided with:
possibly one or a plurality of sensors indicating the state or status (e.g. on/off) of one or a
plurality of sources, consumers and/or consumer areas;
a data acquisition control unit for the collection of data from the sensors;
a computing unit for carrying out the method in accordance with the invention.

Such an arrangement can be used to apply a method in accordance with the invention.

BRIEF DESCRIPTION OF THE DRAWINGS

To better demonstrate the characteristics of the invention, a number of preferred variants of a method and gas network in accordance with the invention have been described below, by way of example without any restrictive character, with reference to the accompanying drawings, in which.

DETAILED DESCRIPTION OF VARIOUS EMBODIMENTS

Figure 1:
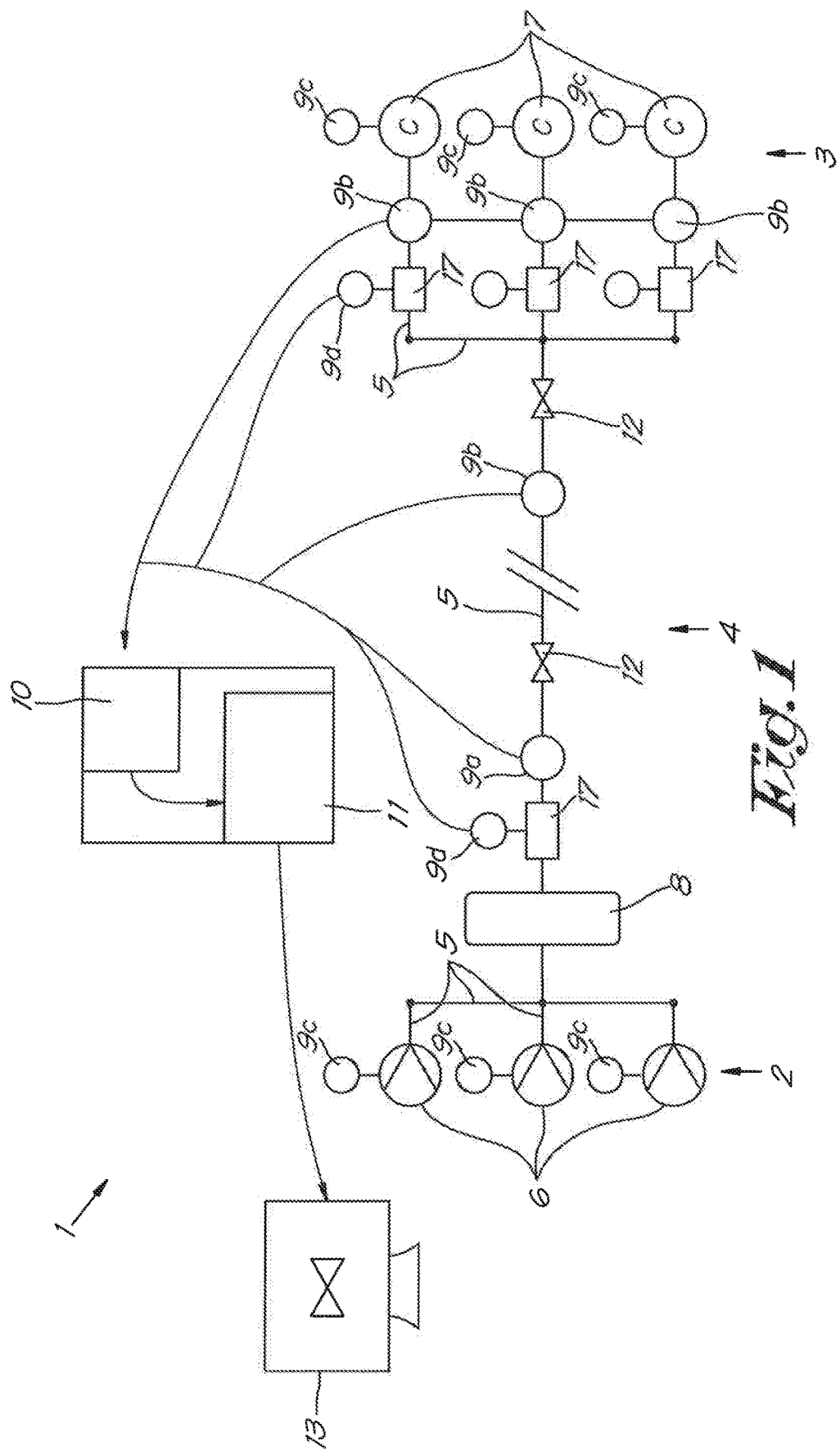
FIG. 1 schematically shows an arrangement in accordance with the invention.

The gas network 1 in FIG. 1 comprises mainly a source side 2, a consumer side 3 and a network 4 of pipelines 5 between the two.

The gas network 1 in this case is a gas network 1 under pressure, i.e. there is a pressure higher than the atmospheric pressure. The gas can be air, oxygen or nitrogen or any other non-toxic and/or hazardous gas or mixture of gases.

The source side 2 comprises a number of compressors 6, in this case three, which generate compressed air. The consumer side 3 comprises a number of consumers 7 of compressed air, in this case also three.

It is also possible that the compressors 6 contain compressed air dryers.

It is not excluded that there may also be compressors 6 downstream of the gas network. This is referred to as "boost compressors".

The compressed air is routed through the network 4 of pipelines 5 from the compressors 6 to the consumers 7.

This network 4 is in most cases a very complex network of pipelines 5.

FIG. 1 shows this network 4 in a very schematic and simplified way. In addition, the associated shut-off and bypass valves in the gas network 1 are not explicitly indicated in order to maintain the simplicity in FIG. 1.

In most real situations, the network 4 of pipelines 5 consists of a large number of pipelines 5 that connect the consumers 7 in series and in parallel with each other and with the compressors 6. It is not excluded that part of the network 4 adopts or comprises a ring structure.

This is because the gas network 1 is often extended over time with additional consumers 7 or compressors 6, whereby new pipelines 5 between the existing pipelines 5 have to be laid, which leads to a tangle of pipelines 5.

In this case, the gas network 1 is also, but not necessarily, equipped with a pressure vessel 8, wherein all compressors 6 are in front of this pressure vessel 8.

It is not excluded that there may be one or more pressure vessels 8 downstream of the gas network 1.

In addition, components 17, such as filters, separators, atomizers and/or regulators, can also be provided in the gas network. These components 17 can be found in various combinations and can be located both near the pressure vessel 8 and close to the individual consumers 7.

In the example shown, these components 17 are provided after the pressure vessel 8 and close to the individual consumers 7.

Network 4 further includes a number of sensors $9a$, $9b$, $9c$, $9d$, which are located at different locations in network 4.

In this case, one flow sensor $9a$ is placed just after the aforementioned pressure vessel 8, which will measure the total flow q provided by all compressors 6. It is also possible that the individual flows of the compressors 6 are measured by themselves.

In addition, the figure shows four pressure sensors $9b$, which measure the pressure at different locations in the network 4.

A pressure sensor $9b$ to measure the pressure in the pressure vessel 8 is also recommended to correct the "mass in-mass out" principle for large, concentrated volumes.

It is clear that more or less than four pressure sensors $9b$ can also be provided. In addition, the number of flow sensors $9a$ is not limiting for the invention.

In addition to flow sensors $9a$ or pressure sensors $9b$, additional, or alternatively, sensors $9a$, $9b$ may be used to determine one or a plurality of the following physical parameters of the gas: differential pressure, gas velocity, temperature or humidity.

In addition to the aforementioned sensors $9a$ and $9b$, which measure the physical parameters of the gas, there are also a number of sensors $9c$, or 'state sensors $9c$', which are located in the vicinity of the compressors 6, consumers 7 or consumer areas. Preferably, these sensors $9c$ are part of the consumers 7 themselves, which is referred to as smart consumers.

As explained later, by taking into account the state or status (e.g. on/off) of the compressors 6, consumers 7 or consumer areas using the state sensors 9c, the cross-sensitivity of the estimation algorithms can be reduced so that these estimation algorithms become more reliable.

It is also possible that at least some of the sensors 9a, 9b, 9c together with a source 6 and/or consumer 7 are integrated in one module. This is referred to as 'smart connected pneumatic devices'.

It is also possible to use sensors 9a, 9b which measure the pressure or flow of the gas of the consumers 7 or in the consumer area. It is also possible to use sensors that measure the temperature of the gas of the consumers 7 or in the consumer area.

The aforementioned differential pressure sensors coming from the group of additional or alternative sensors 9a, 9b are preferably placed over filter, separator, atomizer, and/or regulator components 17. It goes without saying that the number of differential pressure sensors 9d may differ from what is shown in FIG. 1.

The aforementioned humidity and temperature sensors coming from the group of additional or alternative sensors 9a, 9b are preferably mounted at the inlet and/or outlet of the compressors 6 and the consumers 7.

In the example shown, the aforementioned additional or alternative sensors 9a, 9b are not all included in the gas network 1, but it goes without saying that this is also possible. Certainly, in more extensive and complex gas networks 1 such sensors 9a, 9b can be used, as well as in networks 1 where only the volumetric flow rate is measured instead of the mass flow rate.

In accordance with the invention, the gas network 1 is further provided with a data acquisition control unit 10 to collect data from the aforementioned sensors 9a, 9b and 9c.

In other words, sensors 9a, 9b, 9c determine or measure the physical parameters of the gas and the condition of the compressors 6, consumers 7 and/or consumer areas and send these data to the data acquisition control unit 10.

In accordance with the invention, the gas network 1 is further provided with a computing unit 11 for processing the data from sensors 9a, 9b, 9c, wherein the computing unit 11 will be able to carry out the method for detecting and quantifying obstructions 12 in the gas network 1, as explained below.

The aforementioned computing unit 11 can be a physical module which is a physical part of the gas network 1. It cannot be excluded that the computing unit 11 is not a physical module, but a so-called cloud-based computing unit 11, which may or may not be connected wirelessly to the gas network 1. This means that the computing unit 11 or the software of the computing unit 11 is located in the 'cloud'.

In this case, the gas network 1 is further provided with monitor 13 to display or signal obstructions 12 that were detected using the method.

The operation of gas network 1 and the method in accordance with the invention is very simple and as follows.

Figure 2:
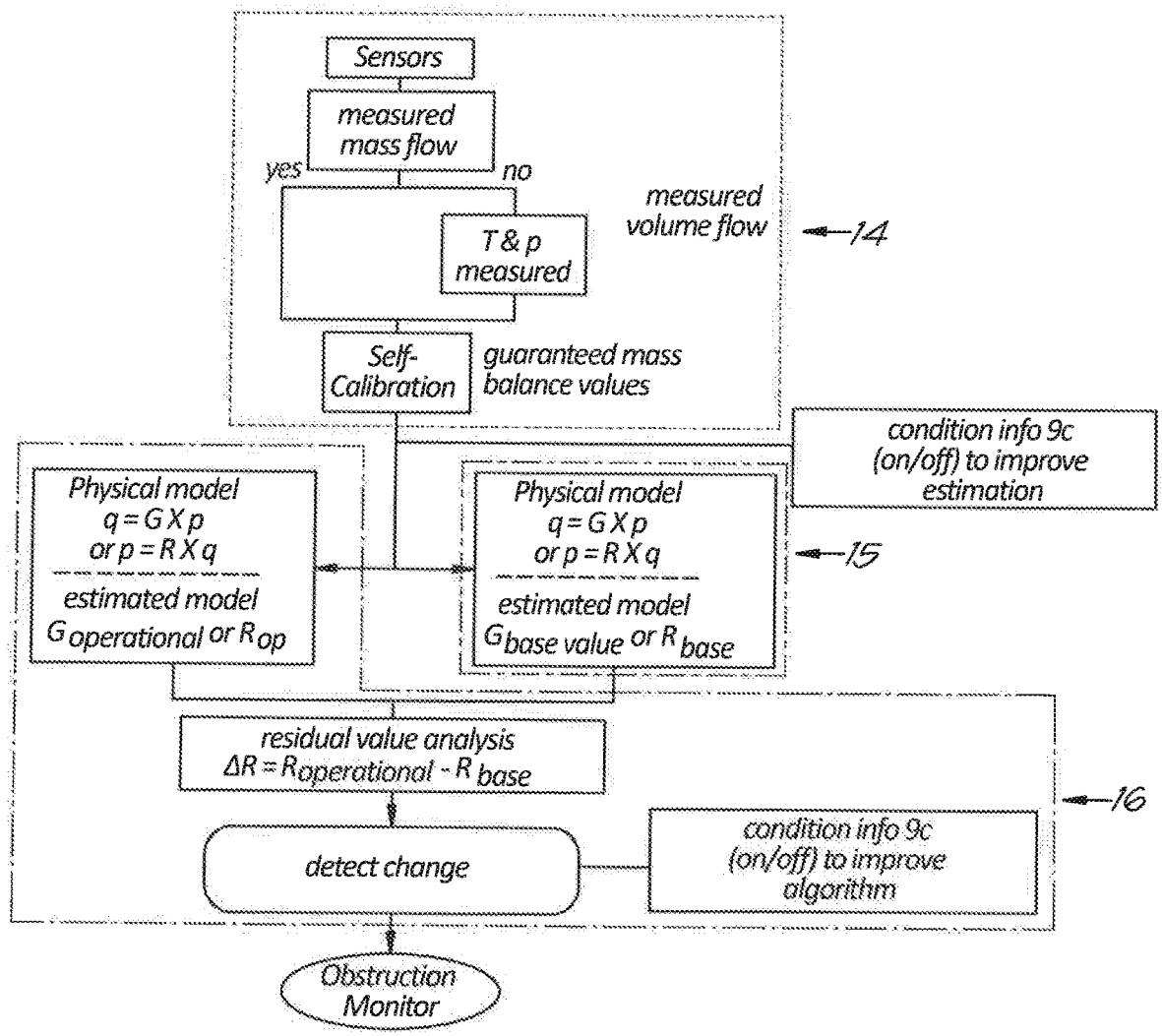
FIG. 2 shows a schematic flowchart of the method in accordance with the invention.

FIG. 2 schematically illustrates the method for detecting and quantifying obstructions 12 in the gas network 1 of FIG. 1.

In the first phase 14, the start-up phase 14, sensors 9a, 9b and 9c are calibrated before use if necessary. It goes without saying that if there are other sensors, they can also be calibrated before use.

This happens once when the sensors 9a, 9b, 9c are placed in the gas network 1. Of course, it is possible that sensors 9a, 9b, 9c may be recalibrated over time.

Preferably, the sensors 9a, 9b, 9c are calibrated by means of an in-situ self-calibration. This means that sensors 9a, 9b, 9c in the gas network 1, i.e. after they have been installed, are calibrated. 'In service' or 'in-situ' means calibration without removing sensor 9a, 9b, 9c from network 1.

This way you can be sure that the placement and/or possible contamination of the sensors 9a, 9b, 9c will not affect their measurements, because you will only do the calibration after the placement of the sensors 9a, 9b, 9c or repeat the calibration after a certain period of time.

Then the second phase 15, or the baseline phase 15, also known as the zero phase, starts.

In this phase, a physical model or mathematical relationship is determined between the measurements of a first group of sensors 9a, 9b, 9c and a second group of sensors 9a, 9b, 9c based on physical laws using estimation algorithms. By taking into account any additional state sensors 9c (e.g. on/off) of the compressors 6, consumers 7 or consumer areas, the cross-sensitivity of the estimation algorithms can be reduced, making these estimation algorithms more reliable.

Based on known physical laws, a model can be made between a first group of sensors 9a, 9b and a second group of sensors 9a, 9b.

This first group of sensors 9a, 9b preferably all measure the same physical parameter of the gas, for example pressure p and/or pressure difference $\Delta p$, at different locations in the gas network 1. The second group of sensors 9a, 9b preferably all measure the same physical parameter of the gas, for example the flow rate q.

The first group of sensors 9a, 9b comprises in this case different pressure and/or differential pressure sensors 9b at different locations in the gas network 1 and the second group of sensors 9a, 9b comprises in this case one, and preferably at least one, flow sensor 9a. However, this is not strictly necessary, as long as there are no common sensors in the two groups of sensors 9a, 9b the approach remains intact. The only provision is that the cross-section of the two groups of sensors 9a, 9b must be empty.

For example, the model consists of a mathematical relation such as a matrix or the like, in which there are still a number of parameters or constants. The matrix will be a measure of the resistance, or inverse conductivity, of the gas network 1.

These parameters or constants can be determined by reading out the relevant sensors 9a, 9b, 9c and using estimation algorithms.

This is based on a kind of baseline situation, or a normal situation of the gas network 1 without obstructions 12.

The data acquisition control unit 10 will read the sensors 9a, 9b, 9c and send these data to the computing unit 11, where the necessary calculations will be performed to determine the aforementioned parameters or constants.

Once the parameters or constants have been determined, the physical model is determined in the form of a mathematical relationship between the two groups of sensors 9a, 9b.

Next, the third phase 16 or the operational phase 16 will be started, in which the physical model or mathematical relationship between the measurements of the first group of sensors 9a, 9b and the second group of sensors 9a, 9b will be set up again using estimation algorithms to predict obstructions 12 in the gas network 1.

In this phase 16, the following steps are carried out:
reading out the first group and second group of sensors 9a, 9b, 9c;

re-estimating, determining or calculating the physical model or mathematical relationship on the basis of the read measurements from the sensors 9a, 9b, 9c;

determining or calculating the presence of an obstruction 12 in the system from the difference between the parameters of the physical model or mathematical relationship as determined during baseline phase 15 and operational phase 16;

generating an alarm if an obstruction is detected and, if appropriate, the degree of obstruction and/or the cost of the obstruction.

In order to determine an obstruction 12 in the gas network 1, in the penultimate step it will be examined whether the aforementioned difference exceeds a certain threshold value. This then indicates an obstruction 12 in the gas network 1.

This threshold value can be set in advance or selected empirically.

When an obstruction 12 is detected, an alarm will be generated. In this case, this is done with the help of monitor 13, which displays the alarm.

The user of the gas network 1 will notice this alarm and be able to take the appropriate steps.

These steps of the operational phase 16 are preferably repeated sequentially and regularly at a certain time interval.

This means that during the entire operational period of the gas network 1 obstructions 12 can be detected and traced and not just once during or shortly after the start up of the gas network 1.

The aforementioned time interval can be selected and set depending on the gas network 1.

In a preferred variant of the invention, at certain moments the operational phase 16 will be temporarily interrupted or stopped, after which the baseline or zero phase 15 will be re-established to redefine the physical model or mathematical relationship between the measurements of different sensors, before the operational phase 16 is resumed.

'At certain moments' should herein be interpreted as moments that are preset, for example once a week, per month or per year, or as moments that can be chosen by the user.

The time span in which the baseline phase 15 is estimated again is much longer compared to the time span in which the physical model or mathematical relation is established again during the operational phase. In other words, the update time step during baseline phase 15, to accommodate variations in the network 1, is much longer than the update time step during the operational phase 16.

The physical model will be updated to take into account the possible time-varying behavior of the system.

These include, for example, obstructions 12 in the network 4 which are repaired by replacing the relevant parts or valves, or modifications or expansions of the network 4 which change the aforementioned 'baseline' situation of the gas network 1.

Although in the example of FIG. 1, it concerns a gas network 1 under pressure, it can also be a gas network 1 under vacuum.

Source side 2 then comprises a number of sources of vacuum, i.e. vacuum pumps or similar.

In this case, the consumer 7 or consumer areas have been replaced by applications that require vacuum.

Furthermore, the method is the same as disclosed above.

This invention is by no means limited to the embodiments by way of example and shown in the figures, but such a method and gas network as claimed in the invention can be carried out in different variants without going beyond the scope of the invention.

The invention claimed is:

1. A method for detecting and quantifying obstructions in a gas network under pressure or vacuum; the gas network comprising:

one or more sources of compressed gas or vacuum;

one or more consumers, consumer areas of compressed gas or vacuum applications;

pipelines or a network of pipelines to transport the compressed gas or vacuum from the sources to the consumers, consumer areas or applications;

a plurality of sensors which determine one or a plurality of physical parameters of the gas at different times and locations in the gas network;

wherein the gas network further provides one or a plurality of sensors capable of recording a state or status of one or a plurality of sources, consumers, or consumer areas and that the method comprises the following phases:

a start-up phase during which the sensors are to be calibrated for use;

a baseline or zero phase determining an initial physical model or mathematical relationship between measurements from a first set of sensors and a second set of sensors based on physical laws using estimation algorithms;

an operational phase in which the physical model or mathematical relationship between the measurements of the first set of sensors and the second set of sensors is re-established at regular time intervals by means of estimation algorithms to predict gas network obstructions;

wherein the operational phase comprises the following steps:

reading out the first set and second set of sensors;

re-estimating, determining or calculating the physical model or mathematical relationship on the basis of the read measurements from the first and second set of sensors;

determining or calculating of the existence of an obstruction in the system based on a difference and/or its derivatives between the parameters of the physical model or mathematical relationship as determined during the baseline or zero phase and the operational phase;

generating an alarm if an obstruction is detected, wherein the aforementioned physical model or mathematical relationship takes a form of a matrix of parameters or constants, wherein modifications of these parameters or constants are being monitored during the operational phase.

2. The method according to claim 1, wherein the first set of sensors comprises different pressure and/or differential pressure sensors at different locations in the gas network and a plurality of sensors that can determine the state of the sources, consumers or consumer areas, and the second set of sensors comprises at least one flow sensor.

3. The method according to claim 1, wherein the first or second sets of sensors are calibrated by means of an in-situ self-calibration.

4. The method according to claim 1, wherein the first or second sets of sensors can measure one or a plurality of the following physical parameters of the gas:

pressure, differential pressure, temperature, flow rate, humidity.

5. The method according to claim 1, wherein at certain moments, the operational phase is temporarily interrupted or stopped, after which the baseline or zero phase is resumed in order to redefine the physical model or mathematical relationship between the measurements of different sensors, before the operational phase is restarted.

6. The method according to claim 1, wherein the operational phase steps are repeated sequentially at a given time interval.

7. A gas network under pressure or under vacuum, the gas network being at least provided with:
one or more sources of compressed gas or vacuum;
one or more consumers, consumer areas of compressed gas or vacuum applications;
pipelines or a network of pipelines to transport the compressed gas or vacuum from the sources to the consumers, consumer areas or applications;
a plurality of sensors which determine one or a plurality of physical parameters of the gas at different times and locations in the gas network;
wherein the gas network is further provided with:
one or a plurality of sensors indicating the state or status of one or a plurality of sources, consumers and/or consumer areas;
a data acquisition control unit for a collection of data from the sensors;
a computing unit for carrying out the method according to claim 1.

8. The gas network according to claim 7, wherein at least part of the plurality of sensors together with a source and/or consumer are integrated in one module.

9. The gas network according to claim 7, wherein the gas network is further provided with a monitor to display or signal obstructions, degree of obstruction, obstruction costs and location.

10. The gas network according to claim 7, wherein the sensors that can register the state or condition of a consumer are part of the consumers themselves.

11. The gas network according to claim 7, wherein the computing unit is a cloud-based computing unit, which is connected to the gas network with or without a wireless connection.

* * * * *